United States Patent [19]

Friedrich et al.

[11] 4,166,920
[45] Sep. 4, 1979

[54] MULTI-SECTION INTERNALLY COOLED HIGH-VOLTAGE HIGH-ENERGY CABLE AND A METHOD OF MANUFACTURING THE SAME

[75] Inventors: Jürgen Friedrich, Cologne; Heinrich Brakelmann, Kamp-Lintfort; Werner Rasquin, Cologne, all of Fed. Rep. of Germany

[73] Assignee: Felten & Guilleaume Carlswerk Aktiengesellschaft, Cologne, Fed. Rep. of Germany

[21] Appl. No.: 817,110

[22] Filed: Jul. 19, 1977

[30] Foreign Application Priority Data

Jul. 21, 1976 [DE] Fed. Rep. of Germany ....... 2632808

[51] Int. Cl.² .......................... H01B 7/34; H02G 3/06
[52] U.S. Cl. ................................. 174/15 C; 174/21 R;
174/94 R
[58] Field of Search ................. 174/15 C, 21 R, 21 C,
174/21 CA, 94 R; 285/286, 149, 55

[56] References Cited

U.S. PATENT DOCUMENTS

| 2,810,010 | 10/1957 | Davey .......................... 174/15 C X |
| 3,482,304 | 12/1969 | Brigot et al. ..................... 285/286 X |
| 3,553,342 | 1/1971 | Papadopulos ...................... 174/15 C |
| 3,585,271 | 6/1971 | Reynolds et al. ............ 174/21 CA X |
| 3,610,807 | 10/1971 | Whitehead ..................... 174/21 C X |
| 3,678,175 | 7/1972 | Appiani et al. ................ 174/21 R X |
| 3,843,170 | 10/1974 | Bagnulo ........................... 285/286 X |
| 3,876,136 | 4/1975 | Bomberger, Jr. ................. 285/286 X |

FOREIGN PATENT DOCUMENTS

| 2317013 | 10/1974 | Fed. Rep. of Germany ........ 174/15 C |
| 2404720 | 8/1975 | Fed. Rep. of Germany ........ 174/15 C |

Primary Examiner—Arthur T. Grimley

Attorney, Agent, or Firm—Michael J. Striker

[57] ABSTRACT

A cable includes a plurality of elongated sections each composed of a tubular electric conductor, electric insulation surrounding the electric conductor, and an outer cable jacket surrounding the electric insulation. An inner tubular member of titanium or alloyed stainless steel is accommodated in the electric conductor and defines a channel for a cooling medium such as water. The inner tubular members of each two consecutive cable sections have flanges that are welded or soldered to one another, and a bridging element is interposed between the electric conductors of the two consecutive electric conductors and welded or soldered thereto. The electric conductor preferably is a circumferentially complete one-piece tubular element extruded onto the inner tubular member. In the region of contact of the electric conductor with the inner tubular member, there may be provided at least one groove extending longitudinally of the cable for conducting the cooling medium, which escapes from the cooling channel in case of damage to the inner tubular member, to the ends of the cable so as to indicate the occurrence of such damage thereat. A tube having a high thermal resistance is received in the groove of each of the cable sections and in the bridging element, extending longitudinally across the connection of the respective electric conductor with the bridging element. A method of manufacturing such cable includes shaping the electric conductor around the inner tubular member, joining the inner tubular members of the two consecutive cable sections by welding or soldering, and subsequently joining the electric conductors surrounding the inner tubular members of the two consecutive cable sections by welding or soldering the bridging element to such electric conductors.

10 Claims, 4 Drawing Figures

MULTI-SECTION INTERNALLY COOLED HIGH-VOLTAGE HIGH-ENERGY CABLE AND A METHOD OF MANUFACTURING THE SAME

BACKGROUND OF THE INVENTION

The present invention relates to an internally cooled high-energy cable consisting of a plurality of consecutive sections, and more particularly to a water-cooled high-voltage high-energy cable having a closed internal cooling channel.

There are already known high-energy cables including a plurality of radially superimposed layers of various properties, which surround one another and the innermost one of which surrounds an internal cooling channel. It is already known, for transmitting energies in the order of 2,000 MVA, to provide a cable which is formed with an internal cooling channel bounded by the electric conductor itself. Experience with this type of cable has shown that, when the electric conductor is made of aluminum, the diameter of the cooling channel should be greater than 60 millimeters, particularly equal to or exceeding 70 millimeters.

It has also been already proposed to use water as the cooling medium for internally cooling the high-energy cable. However, may problems are encountered when water is used as the cooling medium. So, for instance, when the cooling channel is bounded by the electric conductor itself as mentioned above, that is, when the innermost layer of the cable is of a material having high electric conductivity, such as aluminum, there exists the danger that the electric conductor will be attacked by the cooling medium, that is cooling water, and will corrode over a period of time until the cable is rendered useless.

Further difficulties are encountered when the electric conductor is constituted by a plurality of layers some of which are circumferentially complete tubular electric conductors and some of which are constituted by layers or segments of elongated electrically conductive elements which surround or are surrounded by the tubular electric conductors. Such a multi-layer construction of the electric conductor is often necessary particularly where, as in the present case, the thickness of the electric conductor in the radial direction of the cable is substantial so as to permit bending of the electric conductor during the manufacture, transportation and laying of the cable. The difficulties arising from such a construction are particularly pronounced when the elongated electrically conductive elements are of the same material as the tubular electric conductor. To understand these difficulties, it is to be mentioned that only a certain length of the cable can be transported to the point of use so that the cable is usually assembled from a plurality of such lengths or sections in situ by welding the end portions of such sections to one another. During the welding operation, the consecutive inner tubular elements are welded to one another first, with the elongated electrically conductive elements removed from the region of welding, and then another welding operation is performed for connecting the elongated electrically conductive elements of the consecutive lengths of the cable to one another to form the superimposed layer of the electric conductor which surrounds the inner tubular electric conductor. It will be appreciated that, during the second welding operation, the previously manufactured welded connection of the two consecutive tubular electric conductors will be reheated to the welding temperature, that is to a temperature which at least plasticizes the material of the welded connection of the tubular electric conductors. As a result of this reheating of the welded connection, the quality thereof in most instances suffers so that it is impossible or at least very difficult to assure a faultless water-tight connection between the two inner tubular electric conductors.

Another problem to be considered when manufacturing such cables is that the materials of the various layers of the electric conductor may electrically interact with one another, particularly when having different electric potentials. In other words, such materials will act as an electric cell and thus cause corrosion of at least one of such materials. Therefore, caution must be exercised in selecting the proper materials for the various components of the cable and other members which connect the cable into an electric circuit, which come into contact with the cooling medium.

In the electric cables which have been discussed so far, there also exists the danger that, due to the relatively low resistance to wear of the electric conductor bounding the cooling channel through which the cooling water or similar cooling fluid flows at relatively high speeds, the erosion of the internal surface of the electric conductor will be relatively high, which will render the electric cable of the prior art useless within a relatively short period of time, especially after the cooling fluid starts leaking through the electric conductor. To avoid the above-discussed disadvantages, it has already been proposed to provide an inner tubular member of alloyed stainless steel or of titanium within the electric conductor proper, which inner tubular member then bounds the cooling channel for the cooling medium and prevents such cooling medium from coming into contact with the electric conductor. Then, the inner tubular members of any two consecutive sections of the cable are welded to one another first, after possibly bending the other conductor away from the connecting zone, and then the electric conductors of the consecutive cable sections are welded to one another, possibly after reinstating the previously bent portions of the electric conductors into their original positions.

Advantageous as this procedure may be in many applications, in some instances problems may develop during such connecting procedures, especially for some materials of the various components of the cable and for some connecting procedures. Also, the welding operations have to be performed with a high degree of care and skill, thus putting higher demands on the welding equipment and the operating personnel. These problems are further aggravated when the two consecutive sections are to be connected outside the manufacturing plant, that is, during the laying of the cable, as is usually the case.

SUMMARY OF THE INVENTION

Accordingly, it is an object of the present invention to avoid the above-discussed disadvantages of the prior art cables.

It is a further object of the present invention to present a reliable, corrosion and erosion resistant cable of the type where a cooling medium such as water flows through the interior of the cable.

It is yet another object of the present invention to provide a water-cooled cable in which the consecutive sections of the cable can be joined with one another in a simple and inexpensive manner, without sacrificing the quality of the connection.

It is still another object of the present invention to so construct a multi-layer electric cable that the layer immediately bounding the cooling channel plasticizes at a higher temperature than that needed for welding the electric conductor and does not constitute an electric cell with the electric conductor.

It is a concomitant object of the present invention to devise a method of manufacturing such a cable.

Yet more particularly, it is an object of the present invention to provide a method for manufacturing such cable in such a manner that the consecutive sections of the cable which together constitute the cable are sealingly connected to one another.

Another object of the present invention is to provide a flexible cable which can be wound up on reels both during the manufacture and the transportation thereof, without adversely affecting the circular cross-section thereof.

In pursuance of these objects and others which will become apparent hereafter, one feature of the present invention resides, briefly stated, in an internally cooled high-voltage high-energy cable comprising a plurality of elongated cable sections each having longitudinally spaced ends and each including an electric conductor of a tubular configuration and a corrosion-resistant inner tubular member within said electric conductor and defining a cooling channel for a cooling medium; and means for connecting said ends of consecutive ones of said cable sections with one another, including a first connection sealingly interconnecting said inner tubular members of said consecutive cable sections with one another, a bridging element having a central portion surrounding said first connection and end portions extending beyond the latter longitudinally of the cable, and two second connections connecting said end portions of said bridging element to said electric conductors of said consecutive cable sections. The inner tubular member may be of stainless steel or titanium, as a result of which the corrosion of the inner tubular member is for all intents and purposes avoided. As a consequence hereof, it is achieved that the cooling medium or cooling water is effectively separated from the electric conductor for the entire lifespan of the electric cable which may and should amount to about forty years.

When alloyed stainless steel is used for the inner tubular member, it is relatively unimportant which other metallic materials are used for the components of the cooling circuit since it is well known that copper and alloyed steel on the one hand, or aluminum and alloyed steel on the other hand, can be combined without encountering any difficulties.

It is proposed according to the present invention to connect the consecutive sections of the cable by welding and/or soldering. Thus, the associated end portions of the consecutive inner tubular members may be welded to one another after the electric conductor has been removed or offset in the immediate region of the welded connection. As a result of the accessibility of the region where the welded connection is to be produced, it is possible to manufacture an excellent welded connection of any two adjacent inner tubular members defining the cooling channel, and to subsequently examine the welded connection for possible flaws which can be immediately corrected. Once the result of the examination indicates that the welded connection of the particular inner tubular members is flawless, it is possible to connect the surrounding electric conductor by welding or soldering the bridging element thereto without impairing the quality of the welded connection of the inner tubular members. This is preferably achieved in such a way that the temperature used during the welding or soldering operation for interconnecting the electric conductors of any two consecutive cables to the respective bridging element is substantially lower than the temperature needed for welding the inner tubular members so that the heat transmitted to the previously produced welded connection of the inner tubular members does not plasticize the material of the inner tubular members or the connection thereof, particularly in view of the fact that the welded or soldered connection of the bridging element to the respective electric conductor is longitudinally spaced from the welded or soldered connection of the two inner tubular members. As mentioned previously, the ends of the electric conductors are offset relative to the inner tubular members longitudinally of the respective cable sections so that the ends of the inner tubular members project beyond such electric conductors of the respective consecutive cable sections. Then, the above-mentioned bridging element, which is preferably pre-manufactured, bridges the gap between the electric conductors of the consecutive cable sections, being connected to the latter. In addition to bridging such gap, the bridging element advantageously achieves a spatial separation of the welded or soldered connections of the electric conductors to the bridging element from the welded connection of the inner tubular members conducting the cooling medium in the operational condition of the cable. This, in turn, brings about the advantage of a greatly facilitated performance of the respective welding or soldering operations, as well as the possibility to test the respective connections, in a simple manner and with simple means, as to their quality and particularly as to absence of leaks therein.

In addition thereto, it is possible to manufacture the parts of the bridging element, which interconnect the electric conductors, as well as possibly the longitudinal grooves which are provided at the interface of the electric conductor with the inner tubular member and serve for detection of leaks during the operation of the cable, with one another, at a much lower expense than heretofore possible and thus in an economically attractive manner. This is achieved, advantageously, as previously discussed, by welding or soldering the bridging element to the correspondingly offset ends of the electric conductors of the respective consecutive cable sections.

In an advantageous and currently preferred embodiment of the present invention, the ends of the inner tubular member which serve for conducting the cooling medium are flanged and welded to one another at the periphery of the flanged ends. This renders it possible to eliminate the otherwise expectable deformations of the ends of the inner tubular members during the welding operation. Furthermore, the flanging also gives the connecting zone a certain elasticity in the axial direction, which is capable of then compensating for the different thermal expansions of the inner tubular member, on the one hand, and of the electric conductor, on the other hand.

A further advantage of this embodiment of the connection of the inner tubular members of the consecutive sections of the cable resides in the very simple welding operation which may be employed for welding the flanged ends of the inner tubular members. More particularly, inasmuch as it is no longer necessary to maintain the inner tubular members of the two consecutive sections in exact abutment and alignment with one another during the welding operation, the latter may be performed by welders of less than the highest degree of skill. This, of course, further reduces the expenses involved in constructing the cable.

In a further advantageous embodiment of the present invention, a tubular connecting element is interposed between the flanged ends of the inner tubular members of the two consecutive cable sections, also being flanged in a corresponding manner. Such an intermediate tubular connecting element, which is connected to the flanged ends of the respective inner tubular members in the above-discussed manner, doubles the expansion elasticity of the connection and, in addition thereto, renders it possible to adjust the consecutive cable sections to the local conditions. So, as a consequence hereof, it is possible to compensate for the different lengths of the cable sections which are located next to one another along the same path, by resorting to the use of intermediate connecting elements of different lengths. This is particularly advantageous when separate cables are used for the various phases of an alternating electric current.

In a currently preferred embodiment of the present invention, the bridging element is constructed as a separable, rotationally symmetrical hollow body consisting of at least two pallets, which is provided with an inner depression capable of receiving the connection of the inner tubular members of the two consecutive cable sections. Advantageously, the electrically conductive cross-sectional area of the bridging element at least corresponds to that of the electric conductors of the consecutive cable sections.

It is further advantageous, according to another preferred aspect of the present invention, to construct the bridging element as a generally double-conical element the end portions of which at least in part converge from the central portion thereof. Preferably, such a bridging element consists of at least two separately manufactured components which complement one another into the bridging element which is circumferentially complete, such components being separated from one another along a longitudinally central plane, and being welded to one another. Advantageously, the inclination of the conical parts of the end portions of the bridging element relative to the longitudinal axis of the latter is between 3° and 30°, preferably between 8° and 15°. According to a further aspect of the invention, it is further advantageous when the bridging element has a cylindrical portion in the region of its greatest diameter, which is superposed with the connection of the inner tubular members, with a cylindrical configuration. Another advantageous expedient is the formation of the bridging element with substantially cylindrical regions at the respective ends thereof. Furthermore, it is advantageous to so form the bridging element that the regions of merger of the cylindrical portions with the conical portions are rounded to gradually merge with one another.

The bridging element which is configured in the above-discussed manner and which is composed of the above-mentioned pre-manufactured components, is especially well suited for the attainment of the object of providing a connecting arrangement which satisfies all electrical and mechanical requirements, which is hermetic and durable, and which assures a sufficient safety. The components of the bridging elements, which are manufactured by casting, injection molding or pressing, preferably in the shape of half-shells, can be made of any material, the only requirements being that such material be connectable to the electric conductor by welding or soldering and that it be electrically conductive. So, for instance, when the electric conductor is made of aluminum, the material of the bridging element may also be aluminum. The connection of these components of the bridging element with one another and with the electric conductor can be achieved, in the circumferential direction as well as in the longitudinal direction, by resorting to conventional methods used for welding of aluminum components to one another. On the other hand, it is also possible to use components of the bridging element made of copper, particularly for connecting electric conductors made of copper, but even for connecting electric conductors made of aluminum. In this instance, however, it is necessary to utilize a soldering procedure which achieves a connection which satisfies the requirements as to the mechanical strength and electrical conductivity of the connection.

According to a further currently preferred concept of the present invention, the bridging element, when in its assembled and connected state, surrounds the connection of the two inner tubular members of the consecutive cable sections sealingly and with a spacing therefrom so that, on the one hand, compensation for the different movements of the inner tubular members and of the electric conductors renders possible, for instance, the compensation for differential thermal expansion and, on the other hand, it is possible to interconnect the grooves provided the interfaces between the inner tubular members and the electric conductors of the consecutive cable sections and serving for supervision of the cable during its operation so that cooling medium, such as water, which penetrates or leaks through the inner tubular member in the event to damage thereto, is capable of propagating through the longitudinal grooves and through the spacings within the bridging elements toward the ends of the cable to be detected thereat. To achieve communication between the grooves and the spacings, it is further proposed to arrange a tube of heat-resistant material between the respective groove and the spacing prior to the welding or soldering of the bridging element to the respective conductor element of the respective cable section, the tube being partially accommodated in the groove and partially extending into the spacing so that, during the welding or soldering of the bridging element to the electric conductor, such tube will prevent interruption of communication of the groove with the spacing.

The bridging element is so configurated that it is capable of satisfying all requirements expected therefrom, while only requiring a minimum amount of material and assuming only a minimum amount of space. The most prominent requirement, besides the cross-sectional area which corresponds to or exceeds that of the electric conductor, is the avoidance of glow or corona discharge phenomena which could occur in the region of edges of the bridging element were it not for the rounded gradual merger of the conical parts of the bridging element with the cylindrical parts thereof. Also, the bridging element satisfies other requirements concerning its electric properties in that the angle of inclination of the conical parts of the bridging elements relative to the longitudinal axis thereof is properly selected. The above-mentioned angle is so selected, bearing in mind the particular shape of the bridging element, that the magnitude of the tangential field remains constant along the conical part of the bridging element and does not exceed the maximum value acceptable in the respective voltage range so that, consequently, the longitudinal component of the magnitude of the conductor field does not exceed 0.3 kV/mm. The remaining dimensions or shapes of the bridging element can be accommodated to the then used method of manufacturing the pre-manufactured components of the bridging elements, bearing in mind the peculiarities of the respective water-cooled high-energy cable.

The electric conductor may be massive, that is, it may be a circumferentially complete one-piece tube. However, the electric conductor may also include a plurality of elongated electrically conductive elements which are radially superimposed on the inner tubular member, particularly twisted about the same in layers or in segments. It is also possible for the electric conductor to further include a metallic tubular member immediately surrounding the elongated electrically conductive elements, such as an aluminum tube. A two-fold advantage is achieved by this particular construction of the electric conductor. First of all, the circumferentially complete metallic tubular member surrounds the elongated electrically conductive elements in such a manner that it separates the latter from the electric insulation which circumferentially surrounds the metallic tubular member. Thus, in the event that the inner tubular member develops a crack or otherwise permits the cooling medium to enter the electric conductor, the outer metallic member prevents such leakage cooling medium from entering and damaging the electric insulation. On the other hand, the escaped cooling medium will propagate along the twisted individual electrically conductive elements until it reaches one or both ends of the cable so that, when a periodic inspection of these ends reveals the presence of water, escaping from the cable, outside the cooling channel, this will indicate the perforation of the inner tubular member somewhere between the ends of the cable.

Since the outer metallic tubular members completely surround the elongated electrically conductive elements, a further advantage is obtained. More particularly, it is not necessary to perform the twisting operation of the electrically conductive elements with an extreme degree of care, inasmuch as the outer tubular member provides a smooth outer surface in contact with the electric insulation regardless of any imperfections of the electrically conductive elements themselves or the twisting thereof about the inner tubular member. This, of course, is also true when only the circumferentially complete tubular electric conductor is used, without using the individual electric conductors or wires sandwiched between the inner tubular member and the outer tubular member.

It is further possible to provide an additional layer of electrically conductive elements in radially superimposed relation to the outer tubular member. The advantage obtained by this construction resides in the fact that this additional layer absorbs the outer deformation sources which would otherwise act on the outer metallic tubular member, so that formation of wrinkles or folds on the outer tubular member during the handling thereof, or of the finished cable, such as during repeated winding and unwinding thereof, is effectively prevented.

A further currently preferred aspect of the present invention resides in a method of manufacturing a high-voltage high-energy cable which comprises the steps of forming an inner tubular member of a metallic corrosion-resistant material; shaping a tubular element of an electrically conductive material about the inner tubular member to obtain a cable section; offsetting the tubular element at the end of the cable section longitudinally of the latter so that the respective inner tubular member projects longitudinally beyond the associated tubular element; juxtaposing the ends of consecutive ones of the cable sections with one another; connecting said inner tubular members of the consecutive cable sections to one another at a connecting zone; surrounding said connecting zone by a bridging element extending between the offset ends of the tubular elements of the consecutive cable sections; and joining the bridging element with the offset ends of the tubular elements.

Advantageously, the connecting step includes flanging the ends of the inner tubular members of the consecutive cable sections, and welding the ends of the inner tubular members of the consecutive cable sections to one another. However, instead of directly connecting the flanged ends of the inner tubular members to one another, it is also proposed according to a further preferred aspect of the present invention to interpose a tubular connecting element between the flanged ends of the inner tubular members of the consecutive cable sections, and to circumferentially join the tubular connecting element to the inner tubular members. Such connecting, again, may be achieved by welding.

On the other hand, the surrounding step may include assembling the bridging element from at least two components of complementary configuration and of a material similar to that of the tubular elements of the consecutive cable sections, and attaching the components to one another in the vicinity of the connecting zone, such as by welding or soldering.

The connecting arrangement which is achieved in the above-discussed manner, and which is configurated in the manner discussed previously, excellently accomplishes the objects of the present invention which reside in providing a method of and an arrangement for connecting an internally water-cooled high-energy cable, which connection is leakage-proof and long-lasting, which assures sufficient safety, which can be achieved in a very simple manner, and which is economical. Such a method and arrangement can be used to the same advantage either in the manufacturing plant or outside of the same, at the site of laying of the cable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
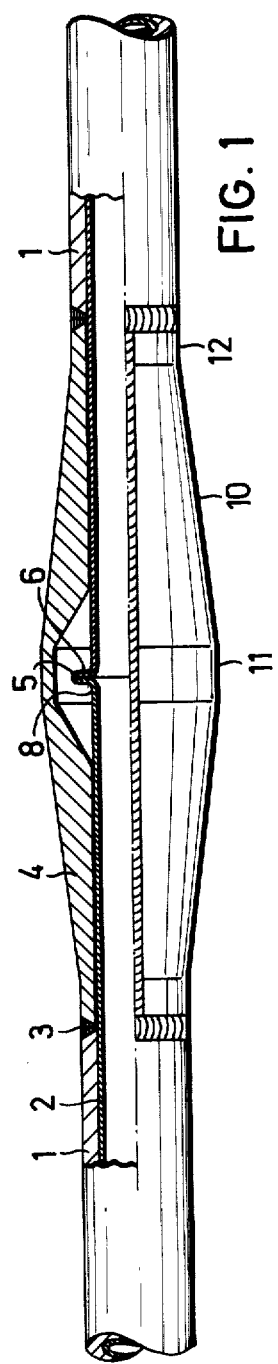
FIG. 1 is a partially sectioned side elevational view of a core of a water-cooled high-energy cable at the region of connection of two consecutive sections thereof.
Figure 2:
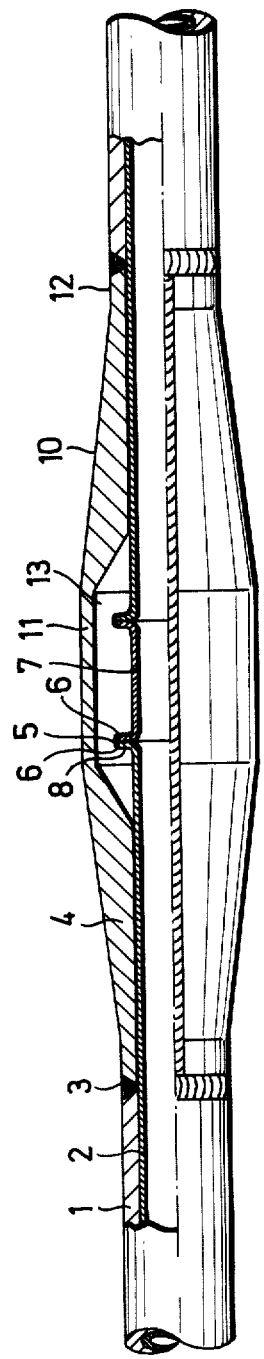
FIG. 2 is a view similar to FIG. 1 but illustrating a modified embodiment of the present invention.

Referring now to the drawing in detail, and first to FIGS. 1 and 2 thereof in which the same reference numerals have been used to designate the same or similar parts, it may be seen therein that the reference numeral 1 refers to an electric conductor made of, for instance, aluminum. The conductor 1 surrounds an inner tubular member 2 bounding a channel 2a for a cooling medium, such as cooling water. The inner tubular member 2 may be of alloyed stainless steel, titanium or the like. The conductor 1 may be a circumferential complete tube which is extruded onto or otherwise provided on the inner tubular member 2. However, it is also possible, as will be discussed in detail later on, for the electric conductor 1 to consist of a plurality of individual electrically conductive members, such as wires, which may be, for instance, twisted about the inner tubular member 2.

As may be further ascertained from FIGS. 1 and 2, the inner tubular member 2 has ends 8 which are flanged. In FIG. 1, the flanged ends 8 of the two inner tubular members 2 are rigidly connected to one another at peripheral zones 6 thereof by a welded connection 5. On the other hand, as illustrated in FIG. 2, in order to render possible a longitudinal adjustment of the connection and an increase in the expansion elasticity thereof, a tubular connecting element 7, which is flanged correspondingly to the end portions 8 of the inner tubular members 2, may be interposed between such end portions 8 and connected to the latter at the peripheral regions 6 similarly to what has been discussed above by a peripheral welded seam 5.

Figure 3:
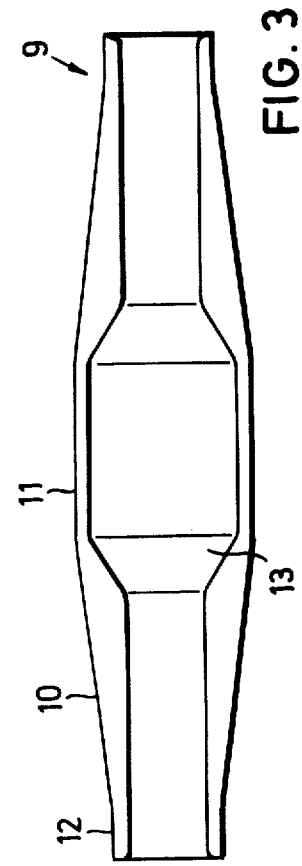
FIG. 3 is a top plan view of a pre-manufactured half-shell to be used as a component of a bridging element for connecting the sections of FIGS. 1 and 2.

The connecting zone of the inner tubular member 2 which bounds the cooling channel 2a of the conductor 1, as illustrated in FIGS. 1 and 2, is surrounded by a conductive bridging element 4 which preferably consists of two pre-manufactured half-shells or components 9 illustrated in some detail in FIG. 3. The bridging element 4 is connected, at its longitudinal ends, with the ends of the respective conductors 1 by means of a circumferential welded or soldered connection 3. It will be appreciated that the bridging element 4 can also be constructed directly at the construction site from correspondingly bent strips or bands of a material weldable or solderable to the material of the conductor 1, which strips or bands are then soldered or welded to the two consecutive conductive elements 1. Under usual circumstances, however, it is preferred that the pre-manufactured components 9 be utilized for the assembly and construction of the bridging element 4.

In the illustrated advantageous embodiments of the present invention, the bridging element 4 is composed of two components 9 which are welded to one another in the longitudinal direction of the bridging element 4. The two components 9 complement each other in forming a hollow rotationally symmetrical body of the bridging element 4 which is of a substantially double-conical configuration. Then, the bridging element 4 has a depression 13 in which the connection 5 of the inner tubular members 2 of the two consecutive cable sections is accommodated. The connection 5 and the end portions 8 of the inner tubular members 2 are received in the depression 13 with a spacing and, toward the respective ends of the bridging element 4, the depression 13 merges into cylindrical bores which are accommodated in dimensions to those of the inner tubular members 2.

Referring now particularly to FIG. 3, it may be seen therein that the bridging element 4, or each component 9 thereof, is so configurated as to satisfy the spatial, but particularly the electrical, requirements. Thus, each of the components 9 of the bridging element 4 may have substantially cylindrical portions 11 and 12 in the central, but particularly at the end, regions thereof. Inbetween the cylindrical portions 11 and 12, the component 9 of the bridging element 4 has conical portions 10 which gradually merge into the cylindrical portions 11 and 12, particularly by being rounded at the regions of merger with the latter. The cylindrical end portions 12 of the components 9 of the bridging element 4 are adjusted in diameter to the outer diameter of the respective electric conductors 1. On the other hand, the central cylindrical portion 11 is adjusted to the outer dimensions of the connection 5 (see FIGS. 1 and 2) and, therefore, the outer diameter of the central cylindrical portion 11 exceeds that of the respective cylindrical end portions 12. This is attributable to the fact that the cylindrical central portion 11 is provided with the depression 13 and, nevertheless, the wall thickness of the cylindrical central portion 11 must be sufficient, that is, the cross-sectional area thereof must at least equal that of the electric conductor 1. As a result of this difference between the outer diameters of the cylindrical portions 11 and 12, the portions 10 interconnecting the cylindrical portions 11 and 12 must, of necessity, have a slope when, as mentioned before, the merger of the portions 10, 11 and 12 is to be gradual as explained above. The portions 10 are so shaped with respect to their slope and cross-sectional areas that the magnitude of the tangential field remains the same along the portion 10.

As a result of the illustrated and above-discussed configuration of the connection between the ends of the inner tubular members 2 bounding the cooling channel 2a, and of the ends of the electric conductor 1, there is obtained a conductor connection which is especially suited for internally water-cooled high-energy cables, which can be manufactured in a simple manner and thus extremely economically, which satisfies all electrical and mechanical requirements, and which is usable, without encountering any difficulties, at any location in order to construct a cable of an arbitrary length from a multitude of relatively short cable sections.

As mentioned previously, the electric conductor 1 need not be a circumferentially complete tubular element but rather it may be composed of a plurality of wires, strands, braids or the like. Also, it is possible and contemplated by the present invention to compose the electric conductor 1 of a tubular conductor member and a plurality of individual wires, strands or similar electric conductors. Furthermore, the present invention also contemplates using the arrangement of FIGS. 1 to 3 in a shielded cable, in which event the cable arrangement discussed previously will be surrounded by an insulation and by a cable jacket.

Figure 4:
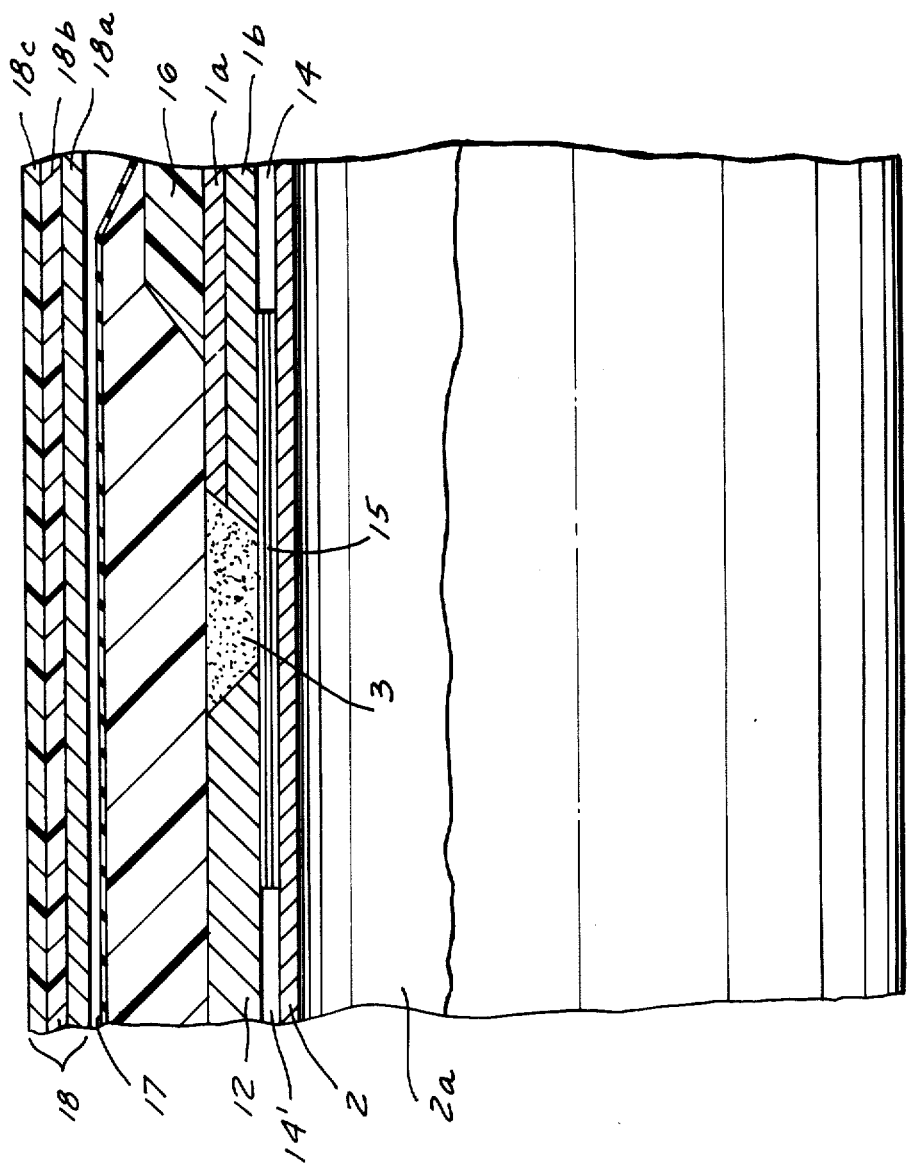
FIG. 4 is a fragmentary sectional view of a detail A of FIG. 1 as incorporated in an insulated cable section and slightly modified.

This possibility is illustrated in FIG. 4 showing a fragment of a shielded cable taken in the vicinity of the connection of the cylindrical end portion 12 of the bridging element 4 with the electric conductor 1. In this modification, the electric conductor 1 includes a tubular conductor member 1b which is surrounded by a layer 1a, such as a layer of wires twisted about the tubular conductor element 1b. The layer 1a is, in turn, surrounded by a cable insulation 16. In the region of the welded connection 3, the layer 1a and the cylindrical end portion 12 of the bridging element 4 are surrounded by an insulating body 17. The insulation 16 and the insulating body 17 are, in turn, surrounded by an outer jacket 18 which, as illustrated, consists of three layers 18a, 18b and 18C.

FIG. 4 also shows that, in order to be able to detect the occurrence of a crack or fissure in the inner tubular member 2, the tubular conductor member 1b is provided, at the interface with the inner tubular member 2, with a groove 14, or a plurality of such grooves, extending in parallelism with the axis of the cable. The grooves 14 permit the leakage cooling medium to propagate to the ends of the cable.

In order for the welded connection 3 not to obliterate the paths of the leakage cooling medium toward the ends of the cable, a tube 15 is inserted into the respective groove 14 and passes through the welded connection 3 so as to establish communication between the groove 14 and the depression 13 of the bridging element 4. As also illustrated in FIG. 4, the communication of the tube 15 with the depression 13 may be accomplished via an additional groove 14' associated with the groove 14 but provided in the bridging element 4. As the result of the provision of the tube 16, the material of the welded connection 3 will not be able to obstruct the passage between the groove 14 and the depression 13 of the bridging element 4.

It will be understood that each of the elements described above, or two or more together, may also find a useful application in other types of constructions differing from the types described above.

While the invention has been illustrated and described as embodied in a method of connecting cable sections of a high-energy cable, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an internally cooled megavolt-ampere cable, in combination, a plurality of elongated cable sections each including an electric conductor of tubular configuration and a metallic corrosion-resistant inner tubular member directly within said electric conductor and defining the internal cooling channel of the megavolt-ampere cable, the electric conductor of each cable section having two longitudinally spaced ends, and the metallic corrosion-resistant inner tubular member of each cable section likewise having two longitudinally spaced ends, the two longitudinally spaced ends of the electric conductor being less distant from each other than are the two longitudinally spaced ends of the metallic corrosion-resistant inner tubular member within the electric conductor; and means for connecting the ends of consecutive ones of the cable sections of the megavolt-ampere cable to each other, including a first, welded connection sealingly and electrically connecting together the ends of the metallic inner tubular members of consecutive cable sections; an elongated electrically conductive current-carrying bridging element having two longitudinally spaced end portions and having a central portion surrounding the first, welded connection, each of the two end portions of the elongated conductive bridging element being located longitudinally intermediate the end of the electric conductor and the end of the metallic inner tubular member of a respective one of the adjoining consecutive cable sections and being in electrically conductive welded or soldered engagement with the end of the electric conductor of the respective one of the adjoining consecutive cable sections; elongated cable insulating means surrounding the electric conductor; and an elongated outer cable jacket surrounding the elongated cable insulating means.

2. In an internally cooled megavolt-ampere cable as defined in claim 1, the ends of the metallic inner tubular members of the adjoining consecutive cable sections having radially outwardly extending circumferentially complete flanges which are in face-to-face circumferentially complete welded engagement with each other.

3. In an internally cooled megavolt-ampere cable as defined in claim 1, the electric conductor being made of aluminum or copper and the metallic inner tubular member being made of titanium or alloyed steel.

4. In an internally cooled megavolt-ampere cable as defined in claim 1, the ends of the metallic inner tubular members of the adjoining consecutive cable sections having radially outwardly extending circumferentially complete flanges, said first, welded connection comprising an intermediate tubular metallic element having two longitudinally spaced ends each of which likewise has a radially outwardly extending circumferentially complete flange which is in face-to-face circumferentially complete welded engagement with the flange at the end of the metallic inner tubular member of a respective one of the adjoining consecutive cable sections.

5. In an internally cooled megavolt-ampere cable as defined in claim 1, the elongated electrically conductive current-carrying bridging element being an elongated rotation symmetric member of conductive material having a current-carrying cross-sectional area at least as great as the current-carrying cross-sectional area of the electric conductor of the cable sections.

6. In an internally cooled megavolt-ampere cable as defined in claim 5, the rotation symmetric member having an internal diameter which is larger at said central portion than to either side of said central portion.

7. In an internally cooled megavolt-ampere cable as defined in claim 6, the rotation symmetric member comprising two conical portions the larger-diameter ends of which face towards each other, the two conical portions extending at angles of between 3 and 30 degrees relative to the longitudinal axis of the cable.

8. In an internally cooled megavolt-ampere cable as defined in claim 7, the two conical portions extending at angles between 8 and 15 degrees relative to the longitudinal axis of the cable.

9. In an internally cooled megavolt-ampere cable as defined in claim 7, the rotation symmetric member being comprised of plural circumferentially successive shell portions having longitudinally extending edges in welded-together engagement with each other.

10. In an internally cooled megavolt-ampere cable as defined in claim 7, the rotationally symmetric member furthermore including cylindrical end portions which smoothly merge into respective ones of the two conical portions.

* * * * *